US010559129B2

(12) United States Patent
Tytgat et al.

(10) Patent No.: US 10,559,129 B2
(45) Date of Patent: Feb. 11, 2020

(54) METHOD FOR NAVIGATING BETWEEN NAVIGATION POINTS OF A 3-DIMENSIONAL SPACE, A RELATED SYSTEM AND A RELATED DEVICE

(71) Applicant: Alcatel-Lucent, Nozay (FR)

(72) Inventors: Donny Tytgat, Antwerp (BE); Maarten Aerts, Antwerp (BE)

(73) Assignee: Alcatel Lucent, Nozay (FR)

( * ) Notice: Subject to any disclaimer, the term of this patent is extended or adjusted under 35 U.S.C. 154(b) by 50 days.

(21) Appl. No.: 16/062,933

(22) PCT Filed: Dec. 13, 2016

(86) PCT No.: PCT/EP2016/080729
§ 371 (c)(1),
(2) Date: Jun. 15, 2018

(87) PCT Pub. No.: WO2017/102685
PCT Pub. Date: Jun. 22, 2017

(65) Prior Publication Data
US 2018/0357820 A1 Dec. 13, 2018

(30) Foreign Application Priority Data
Dec. 17, 2015 (EP) ...................... 15307039

(51) Int. Cl.
*G06T 19/00* (2011.01)
*G06F 3/01* (2006.01)
(52) U.S. Cl.
CPC ............ *G06T 19/003* (2013.01); *G06F 3/012* (2013.01); *G06F 3/013* (2013.01)
(58) Field of Classification Search
None
See application file for complete search history.

(56) References Cited

U.S. PATENT DOCUMENTS 5,689,619 A * 11/1997 Smyth ................ G02B 27/0093
706/45
2015/0153571 A1* 6/2015 Ballard ................ H04W 76/10
345/8

FOREIGN PATENT DOCUMENTS

WO    WO 2015/060936 A1    4/2015
WO    WO 2015/170142 A1    11/2015

OTHER PUBLICATIONS

L. A. Zaheh, "Fuzzy Sets*," Information and Control 8, pp. 338-353, 1965.

(Continued)

*Primary Examiner* — Yanna Wu
(74) *Attorney, Agent, or Firm* — Fay Sharpe LLP

(57) ABSTRACT

The present invention relates to a method, system and related devices for navigating between navigation points of a 3-Dimensional space where said 3-dimensional space comprises a plurality of navigation points. The method according to the present invention comprises the steps of detecting a current viewpoint rotation angle, further determining a degree of agreement of said current viewpoint rotation angle with a navigation point of said plurality of navigation points and subsequently activating a timing mechanism of the viewpoint activation, said timing mechanism comprising a delay for activating said timing mechanism of the viewpoint activation and a duration of an activation period of said timing mechanism at determining a certain degree of agreement of said current viewpoint rotation angle with a navigation point of said plurality of navigation points. The method further comprises the step of determining a degree of agreement of a portion of a viewpoint rotation angle trace with a viewpoint rotation model and adapting said at least one of said delay for activating said timing mechanism of said viewpoint activation and said duration of said activation period of said timing mechanism (Continued)

based on at least one of said degree of agreement of said current viewpoint rotation angle with a navigation point of said plurality of navigation points and said degree of agreement of said portion of said viewpoint rotation angle trace with said viewpoint rotation model.

15 Claims, 5 Drawing Sheets

(56) References Cited

OTHER PUBLICATIONS

Richard S. Sutton, "Temporal Credit Assignment in Reinforcement Learning," 227 pages, 1984.

F. Rosenblatt, "The Perceptron: A Probabilistic Model for Information Storage and Organization in the Brain," Psychological Review, vol. 65, No. 6, pp. 386-408, 1958.

http://en.wikipedia.org/wiki/Maximum_a_posteriori_estimation, Wikipedia, "Maximum a posteriori estimation," 3 pages, last edited Dec. 28, 2018.

Judea Pearl, "Probabilistic Reasoning in Intellligent Systems: Networks of Plausible Inference," Chapter 2 (pp. 29-75) and Chapter 3 (pp. 77-141) 1988, Morgan Kaufmann Publishers, Inc., San Francisco, California.

Paivi Majaranta et al., Twenty Years of Eye Typing: Systems and Design Issues, Proceedings ETRA 2002 Eye Tracking Research & Applications Symposium, pp. 15-22, XP055222193, 2002.

Oleg Spakov, "On-line Adjustment of Dwell Time for Target Selection by Gaze," Proceedings of the Third Nordic Conference on Human-Computer Interaction, vol. 82, pp. 203-206, XP055282042, 2004.

International Search Report for PCT/EP2016/080729 dated Feb. 10, 2017.

* cited by examiner

METHOD FOR NAVIGATING BETWEEN
NAVIGATION POINTS OF A
3-DIMENSIONAL SPACE, A RELATED
SYSTEM AND A RELATED DEVICE

FIELD OF THE INVENTION

The present invention relates to the field of navigating between navigation points in 3 dimensional space.

TECHNICAL BACKGROUND OF THE INVENTION

Digitally navigating a 3-dimensional space traditionally is a lean-forward experience: one need to actively interact with the environment and control which way to go. While this is feasible, and even logical in certain scenarios such as gaming, it does pose an issue for lean-back scenarios such as watching a free-to-roam 3d concert or a 3d movie. Also pseudo-3d use cases such as multi-view video with user-selectable views suffer from this issue. One needs to be engaged with the content by means of an additional explicit control input (gamepad, keyboard, mouse, etc). This is not always desirable.

The advent of affordable virtual reality devices such as the Oculus Rift emphasizes this issue. It is not enough to wear the Virtual Reality glasses, but one also needs some control method to navigate in the 3d world. This is not acceptable for many lean-back scenarios Solutions exist that allow continuous navigation in a 3d space by moving towards the location that you are looking at. The location to which the user is looking is either determined by a gaze tracking device or is automatically available in the case of Virtual Reality goggles. The applicability of this solution is very limited however due to the continuous movement throughout the scene.

Something that is more feasible, especially for lean-back scenarios, is the limitation of spatial movement to a number of so-called navigation points. Instead of allowing free navigation through the 3d scene, the user is limited to navigating to one of these navigation points.

The selection of a navigation point occurs when watching the point for a sufficiently long time. When the user continues to watch the navigation point, a visual indicator appears that he or she will jump to that point in a short while. The user can still look away at that point in order to cancel the navigation.

In this process of selection of navigation points, there is a timing mechanism for activating a navigation point a user is navigating to, which process includes three stages in the navigation point activation. The initialization delay is the first stage and occurs when the viewing angle is within the appropriate range of a navigation point, but the visual countdown indicator is not shown yet. The second stage initializes the activation point and activates this visual countdown indicator. This is also the cue for the user that, if he or she continues looking in that direction, the viewpoint will jump to that navigation point. Whether or not the user takes an action can be seen as implicit feedback to the system. The third stage activates the activation point by moving to that particular location. One can note here that this is feedback to the system that the activation was actually wanted, otherwise it is the assumption is that the user would have looked away in order to cancel the navigation point activation.

Still a problem of such solution is that unwanted activation of the timing mechanism happens a lot, e.g. when watching content, it is quite feasible that a user simply wants to watch and factually watches in the direction of the navigation point without actual intent to navigate into that direction.

SUMMARY OF THE INVENTION

An objective of the present invention is to provide with a method for navigating between navigation points of a 3-Dimensional space, a related system and a related device but wherein the aforementioned shortcoming or drawbacks of the known solutions are alleviated or overcome.

Accordingly, embodiments of the present invention relate to a method for navigating between navigation points of a 3-Dimensional space, said 3-dimensional space comprising a plurality of navigation points, said method comprising the steps of detecting a current viewpoint rotation angle, determining a degree of agreement of said current viewpoint rotation angle with a navigation point of said plurality of navigation points, and activating a timing mechanism of the viewpoint activation, said timing mechanism comprising a delay for activating said timing mechanism of the viewpoint activation and a duration of an activation period of said timing mechanism at determining a certain degree of agreement of said current viewpoint rotation angle with a navigation point of said plurality of navigation points, where said method further comprises the step of determining a degree of agreement of a portion of a viewpoint rotation angle trace with a viewpoint rotation model and adapting at least one of said delay for activating said timing mechanism of said viewpoint activation and said duration of said activation period of said timing mechanism based on at least one of said agreement of said current viewpoint rotation angle with a navigation point of said plurality of navigation points and said degree of agreement of said portion of said viewpoint rotation angle trace with said viewpoint rotation model.

Correspondingly, embodiments of the invention relate to a system for navigating between navigation points of a 3-Dimensional space, said 3-dimensional space comprising a plurality of navigation points, said system being configured to detect a current viewpoint rotation angle; and
determining an a degree of agreement of said current viewpoint rotation angle with a navigation point of said plurality of navigation points; and
activating a timing mechanism of the viewpoint activation, said timing mechanism comprising a delay for activating said timing mechanism of the viewpoint activation and a duration of an activation period of said timing mechanism at determining (a certain degree of) said agreement, where said method further comprises the step of:
determining an agreement of a portion of a viewpoint rotation angle trace with a viewpoint rotation model; and
adapting said delay for activating said timing mechanism of said viewpoint activation and/or adapting said duration of said activation period of said timing mechanism based on said agreement of said current viewpoint rotation angle with a navigation point of said plurality of navigation points and additionally based on said agreement of said portion of said viewpoint rotation angle trace with said viewpoint rotation model.

Indeed, by additionally determining a degree of agreement of a portion of a viewpoint rotation angle trace with a viewpoint rotation model and subsequently based on this determined degree of agreement of a portion of a viewpoint rotation angle trace with a viewpoint rotation model, adapting at least one of the delay, i.e. the initialization delay, for activating said timing mechanism of said viewpoint activation and the duration of said activation period of said timing mechanism in such manner that the initialization delay for activating said timing mechanism of said viewpoint activation and/or said duration of said activation period of said timing mechanism better matches the intent of a user to navigate to a certain activation point that matches the current viewpoint rotation angle.

In this manner, at activation of the timing mechanism, this timing mechanism is better adapted to deal with users factually watching in the direction of a navigation point without actual intent to navigate to that navigation point and preventing an unintended activation of the navigation point while users watching such a navigation point with the intent to navigate to the meant navigation point the activation is performed more fast.

The determining of a degree of agreement of said current viewpoint rotation angle with a navigation point of said plurality of navigation points may be performed based on the current rotation angle as an input, e.g. by means of a rotation agreement means, in order to determine which navigation point the user intends to navigate to. This navigation is based on a pre-defined set of navigation points with a certain visual activation geometry and a corresponding size, for each of the navigation points, to which the user may navigate to. The visual activation geometry of a navigation point determines the shape and size of such navigation point. It is assessed whether the visual ray intersects with the visual activation geometry, where the visual ray is the ray that originates from the virtual eye from which the scene is currently viewed, by a user, in the direction of the current viewpoint rotation angle. The current viewpoint rotation angle is a tuple, i.e. a 2-valued vector that corresponds to the rotation of the described visual ray. This may be relative to the head position, or alternatively, relative to the world (implementation dependent). These two values are sufficient for this as e.g. a sphere located around the eye could be parameterized as our earth; i.e. using longitude and latitude. A point on this parameterized surface (a specific longitude/latitude) is enough to depict the angle when drawing a line from the eye to this surface point.

The distance between the ray and the visual activation geometry of a certain navigation point is a measure for the degree of agreement of said current viewpoint rotation angle with a navigation point.

The impact of the distance between the ray and the visual activation geometry is determined by asserting whether the ray intersects with the visual activation geometry of each of the activation points. If no intersections occur, a proximity function f is used to determine whether the ray is "in proximity" to the activation geometry by relating the distance to a score. When the distance is too high, the score will be 0. When the distance is 0 (an intersection), the score is 1.

In case of the score is "1", the degree of agreement is highest and in case the score is "0", the degree of agreement is lowest. In case there are multiple activation points of which the score is larger than 0, the distance between the activation point and the virtual eye is taken into account.

Moreover, the determining a degree of agreement of a portion of a viewpoint rotation angle trace with a viewpoint rotation model may be performed by assessing whether the rotation angle evolution, i.e. each portion of a viewpoint rotation angle trace, over time is consistent with the rotation angle model that has been learned up to a certain point in time.

The viewpoint rotation model itself is served as an input to this determining of an agreement, and may be re-used over multiple user sessions within a similar context where similar context refers to a similar rotation angle dynamics.

If the motion of the current viewpoint rotation angle is in accordance with the viewpoint rotation model, the degree of agreement will be high. If not, the degree of agreement will be low. Such viewpoint rotation model may include the current viewpoint rotation angles and the history of viewpoint rotation angles. Additionally such viewpoint rotation model may include potential false positives and false negatives. Such false positives are instances where the model predicted an anomaly while there wasn't an anomaly. False negatives are instances where the model didn't predict an anomaly while there was an anomaly. An anomaly is defined as a part in the trace that does not exhibit the regular rotation angle motion statistics as when one simply views the scene without navigation points. Such irregular motion is said to be an anomaly when it can be attributed to the focusing action at a navigation point. It can be important, depending on the type of modeling, to include this information. This is for example the case for re-training or updating example-based models. For models based on deep learning for instance, this is not needed (as this information resides in the model in an implicit manner already).

The delay, for activating said timing mechanism of said viewpoint activation is the initialization delay. The portion of said viewpoint rotation angle trace being a portion of a series of current viewpoint rotation angles from history until the current time instance. Finally, based on the determined degree of agreement of said portion of said viewpoint rotation angle trace with said viewpoint rotation model in combination with the agreement of said current viewpoint rotation angle with a navigation point of said plurality of navigation points, this initialization delay and/or subsequent duration of the activation period can be determined so that this process of selection of navigation points better matches and predicts the real intent of the user.

According to another embodiment of the present invention, the adapting at least one of said delay for activating said timing mechanism of said viewpoint activation and said duration of said activation period of said timing mechanism additionally is based on saliency information associated with each navigation point of said plurality of navigation points or being based on a saliency map.

The determining and subsequent adapting at least one of said delay for activating said timing mechanism of said viewpoint activation and said duration of said activation period of said timing mechanism additionally may be based on saliency information associated with each navigation point of said plurality of navigation points or being based on a saliency map. This saliency information associated with an activation point may cause the delay, i.e. the initialization delay to decrease in case of less uniform saliency information, e.g. in case there is relevant information in proximity of the meant activation point.

Furthermore, said degree of agreement of a current viewpoint rotation angle with an activation point may depend on at least one of: the visual geometry of an activation point of said plurality of navigation points, a distance between the activation point and the visual ray and a distance between the activation point and the eye position.

Hence at first, the degree of agreement of a current viewpoint rotation angle with an activation point, amongst others, may depend on the visual geometry of an activation point of said plurality of navigation points where the nearest distance from the activation geometry $G_V$ of a certain activation point p to the visual ray may be determined. This distance, between the visual geometry of each activation point of the plurality of activation points and the visual ray may be calculated and based on the distance between each of the activation points and the visual ray, a score is calculated. This score is high (e.g. '1') for a small distance between the visual geometry of each activation point of the plurality of activation points and the visual ray, e.g. the distance is 0 (i.e. the visual ray crosses the visual activation geometry for that activation point); the score will get lower with an increasing distance between the visual activation geometry and the visual ray. The activation point with the smallest distance to visual ray is assigned the highest score, i.e. the highest degree of agreement.

In case there are multiple activation points close together, e.g. in case there is a number of activation points behind each other and it is not clear whether the user is looking at one or the other activation point, such visual ray may cross more than one activation point, it may be necessary to include the distance between the intersection and the eye position as an element for determining the degree of agreement of a current viewpoint rotation angle with an activation point in order to determine which activation point the user is looking at.

A degree of agreement may be determined based on a distance between the eye position and each of the activation points. The closer the activation point is located to the eye position, the higher the degree of agreement.

Correspondingly, further embodiments of the present invention relate to a method according to claim 1 or 2, wherein said degree of agreement of a portion of a viewpoint rotation angle trace with a viewpoint rotation model is determined based on a frequency characteristic of said portion of said viewpoint rotation angle trace.

Indeed, the degree of agreement of a portion of a viewpoint rotation angle trace with a viewpoint rotation model may determined based on a frequency characteristic of said portion of said viewpoint rotation angle trace.

A feature vector is constructed that consists of a concatenation of frequency histograms at a pre-defined number of time scales. For each timescale or range, a frequency analysis of the viewpoint rotation angle trace is performed; e.g. via Discrete Cosine Transform (DCT). The result of this analysis is transformed into a histogram with a fixed number of bins that are spread along the expected frequency range. The portion of the feature vector for this timescale is the concatenation of the magnitude of each of these bins.

This type of feature vector allows for the identification of trace patterns at different time scales and frequency statistics.

Correspondingly further embodiments of the present invention relate to a method according to claim 3, wherein said degree of agreement of a portion of a viewpoint rotation angle trace with a viewpoint rotation model is determined by generating at least one vector of said viewpoint rotation angle trace and subsequently classifying said at least one vector.

Indeed, said agreement of a portion of a viewpoint rotation angle trace with a viewpoint rotation model may be determined by generating at least one vector of said viewpoint rotation angle trace and subsequently classifying said at least one vector. In this embodiment of the present invention, a Multi-class classifier C is trained to return a discretized version of the initialization delay that matches the given feature vector $V_x$. When the system currently has initialization delay "2" for instance (this might be 2 seconds for example), the classifier needs to return "2" in order to be able to initialize the navigation point.]

Accordingly, still a further embodiment of the present invention relates to a method according to claim 3 or 4, wherein said frequency characteristic of said portion of a viewpoint rotation angle trace is applied for updating said viewpoint rotation model.

The viewpoint rotation model is updated with the current and future viewpoint rotation angles and false positives and false negatives and even true positives. Such false positives are instances where the model predicted an anomaly while there wasn't an anomaly. False negatives are instances where the model didn't predict an anomaly while there was an anomaly. An anomaly is defined as a part in the trace that does not exhibit the regular rotation angle motion statistics as when one simply views the scene without navigation points. Such irregular motion is said to be an anomaly when it can be attributed to the focusing action at a navigation point. It can be important, depending on the type of modeling, to include this information. This is for example the case for re-training or updating example-based models. For models based on deep learning for instance, this is not needed (as this information resides in the model in an implicit manner already).

In this manner, by updating the model, the system is trained to deal in a faster way in situations that occurred before.

A classifier is trained by means of example data. This set of data is adapted when the viewpoint rotation model needs to be updated. After the adaptation, the classifier is trained again and results in the new, updated, model.

One can typically do two things to adapt the training set to include new data. A first strategy is to simply include the new data sample (in this case, the vector $V_x$ along with the desired delay). In this case, the model will have potentially conflicting data, however this will be resolved by adding more samples that move consensus towards the required classification. In practice, this means that the classifier will be slower to converge to the new delay and that multiple tries might be needed before the correct classification is done. If this is unwanted, one can add a $2^{nd}$ strategy that identifies conflicting samples in the training set and removes these before retraining the model. As such, one can identify vectors that lie close to the new sample $V_x$, and remove those of which the corresponding delay is not the wanted delay. "Lying close" can be quantified by using a thresholded metric such as the Euclidean distance or the maximum of differences of the values in the vector $V_x$ and the training data sample. When eliminating such "faulty" training data, the classifier will converge much quicker to the wanted result.

In this manner more situations can be recognized and be dealt with in a faster manner so that navigation to an intended navigation point is performed in a faster manner.

Additionally, the viewpoint rotation model is updated with the frequency characteristic of said portion of said viewpoint rotation angle trace:

In case of a false negative, which situation occurs when the navigation point is initialized and activated by a timeout rather than a model match. Hence, the viewpoint rotation couldn't predict that the user actually wanted to navigate to that point. In this case, the knowledge of the maximum delay D is used to locate the time slot which has the representative frequency data.

In case of a false positive, which situation occurs when the user looks away from the navigation point before it was activated (but it was initialized), it is an indication that the initialization was not intended by the user. As such, this should be interpreted as a so-called false positive and the model should be updated in order to prevent this from happening the next time. The delay is increased in order to delay a match in the future, and the frequency feature is removed if this delay becomes the maximum delay.

In case of a true positive, which situation occurs when a navigation point has been initialized and activated by the model successfully. As the user did not move away from the point after initialization, the assumption is that the move was actually wanted by the user. The delay is reduced to make the initialization faster for the next time that this situation occurs.

Further characterizing embodiments of the present method for navigating between navigation points of a 3-Dimensional space are mentioned in the appended claims.

The effects and advantages of the apparatus and systems according to embodiments of the present invention are substantially the same, mutatis mutandis, as those of the corresponding methods according to embodiments of the present inventions.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

Figure 1:
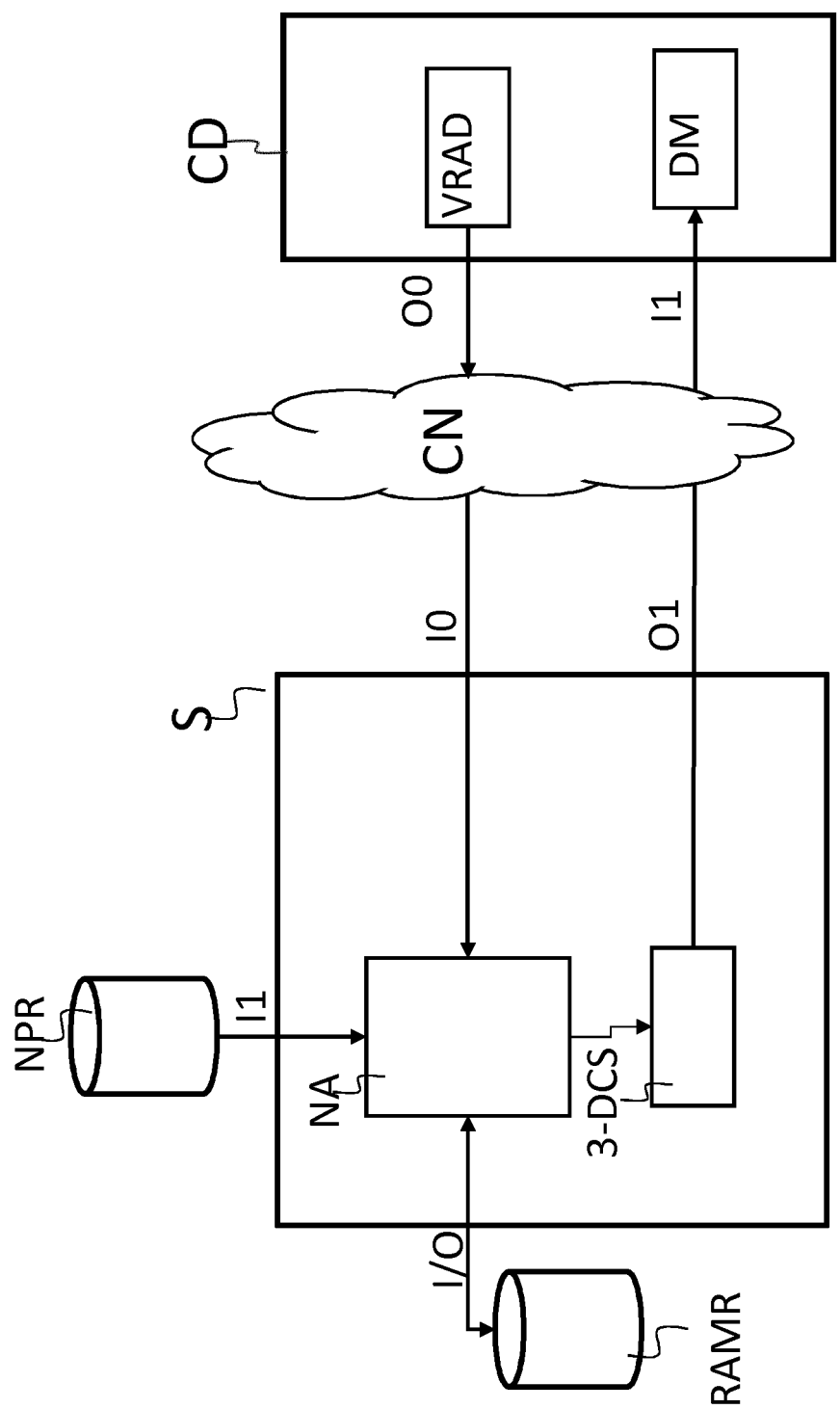
FIG. 1 represents a functional representation of a system for navigating between navigation points of a 3-Dimensional video content.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

In the following paragraphs, referring to the drawing in FIG. 1, an implementation of a user device for navigating between navigation points of a 3-Dimensional video content, according to an embodiment of the present invention is described.

In the first paragraph, elements of the system for navigating between navigation points of a 3-Dimensional video content in FIG. 1 are described, and in a further paragraph, all connections between mentioned elements are defined.

Subsequently, all relevant functional means of the mentioned server S and the client device CD as presented in FIG. 1 are described followed by a description of all interconnections.

In the succeeding paragraph the actual execution of the system is described.

A first essential element of the system is a server S that is configured to transmit 3-Dimensional video content video content from a video repository included in—or coupled to the server S towards a client device CD.

The transmitting of 3-Dimensional video content by the server S may be streaming or more generally be applied by means of any video transporting protocol of this video content towards at least one client device CD of a plurality of client devices.

The server S may be an element of a content cluster or service node in a multimedia content delivery network (see http://en.wikipedia.org/wiki/Content delivery network).

The server S may be a server in a content delivery network or alternatively be a virtualization of the server functionality in a cloud environment, or be a process distributed over several devices, or a GPU farm etc.

It is to be noted that, the system although this is not shown or further described may comprise a plurality of client devices.

The client device CD in turn is configured to receive the 3-Dimensional video content transmitted by the server S.

The client device CD may be an IP connected computer terminal being equipped with a screen and a set of speakers for rendering a multimedia asset streamed by the server S towards the client device CD or an IPTV connected television set coupled via a set-top box to the internet, where this device again is equipped with a screen with a set of speakers for rendering a multimedia asset streamed, or alternatively may be a connected television, tablet PC, other PC such as a fixed PC or laptop PC, smart phone or a TV connected to a Kinect sensor and/or to a gamepad or joystick, or a gaming console etc.

The server S and client device CD may be coupled over a suitable communication network CN optionally containing a concatenation of an access network such as a digital subscriber line access network with coupled DSL modems or a cable network, a mobile communication access network with connected Smartphone or tablet devices or other suitable communications network and core internet network etc. Such 3-dimensional video content may include digital content may include gaming content, a free-to-roam 3d concert or a 3d movie as well as pseudo-3d use cases such as multi-view video with user-selectable views or alternatively a multi-stream 360 video centred around the navigation points. The server S first comprises a 3-Dimensional video content source 3-DCS being a live source or a repository containing 3-Dimensional video content or even a combination of the former where this 3-Dimensional video content source 3-DCS is configured to forward this video content by e.g. by streaming towards the client device CD. Further, the servers comprises an apparatus NA that is configured to control navigating between navigation points of the 3-Dimensional video content, where this 3-dimensional video content comprises a plurality of navigation points (A0 . . . Ax). Additionally the server S comprises rotation angle model repository RAMR being configured to store viewpoint rotation angle model being a model that enables differentiating between a deliberate rotation angle motion towards a navigation point and a normal rotation angle motion that does not intent a navigation point selection. Such model may contain a the history of recent rotation angles, a data structure that is used to determine normal from intended motion (e.g. the tree structure when using decision-tree based classification, or the neural network structure & weights for a deep learning approach) the potential false positives and the false negatives. This current viewpoint rotation angle is determined and obtained from the rotation angle detection means VRAD which may be incorporated in the client device CD.

Figure 3:
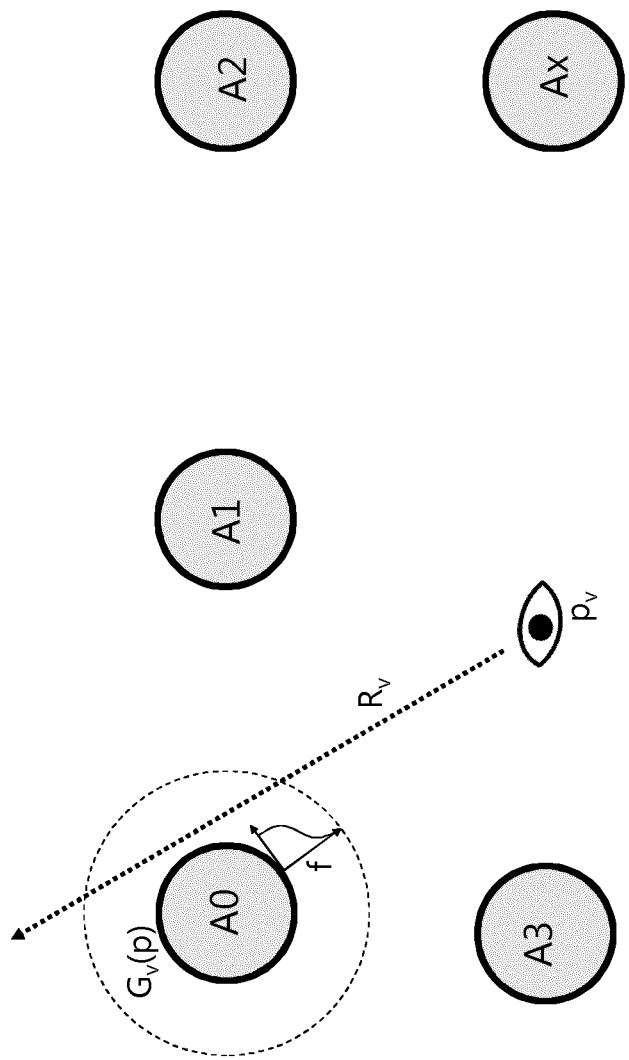
FIG. 3 represents a representation of the viewpoint and the plurality of navigation points which are represented by their visual geometry.

Furthermore, the server S may comprise a navigation point repository NPR being configured to store information on the plurality of navigation points included in the 3-Dimensional video content and additionally comprises information including the visual geometry $G_V$, and the proximity function f (See FIG. 3).

The client device CD in turn may comprise a displaying means DM for presenting the 3-Dimensional video content as forwarded by the server to the user of the client device CD. Furthermore, the client device CD comprises a viewpoint rotation angle detection means VRAD that is configured to detect a current viewpoint rotation angle of the user.

The current viewpoint rotation angle may be/is a tuple, i.e. a 2-valued vector that corresponds to the rotation of the described visual ray. This may be relative to the head position of the user of the client device CD, or alternatively, relative to the world (implementation dependent). These two values are sufficient for this as e.g. a sphere located around the eye could be parameterized as our earth; i.e. using longitude and latitude. A point on this parameterized surface (a specific longitude/latitude) is enough to depict the angle when drawing a line from the eye to this surface point.

The viewpoint rotation angle detection means VRAD may be implemented by means that may range from integration with a gaze tracker up to the extraction of the orientation data from a Virtual Reality device—such as the Oculus Rift.

The 3-Dimensional video content source 3-DCS of the server S is coupled with an output-terminal to an output O1 of the server S and is coupled with an input to an output of the apparatus NA. The apparatus NA is coupled with an input-terminal to an input I0 of the server S and with an input-terminal to an output terminal of the navigation point repository NPR. The rotation angle model repository RAMR further is coupled via an input/output I/O to an input/output-terminal of the apparatus NA.

The client device CD has a rotation angle detection means VRAD which is coupled with an output-terminal to an output O1 of the client device CD. Further, the displaying means DM of the client device is coupled with an input-terminal to an input I1 of the client device CD.

Figure 2:
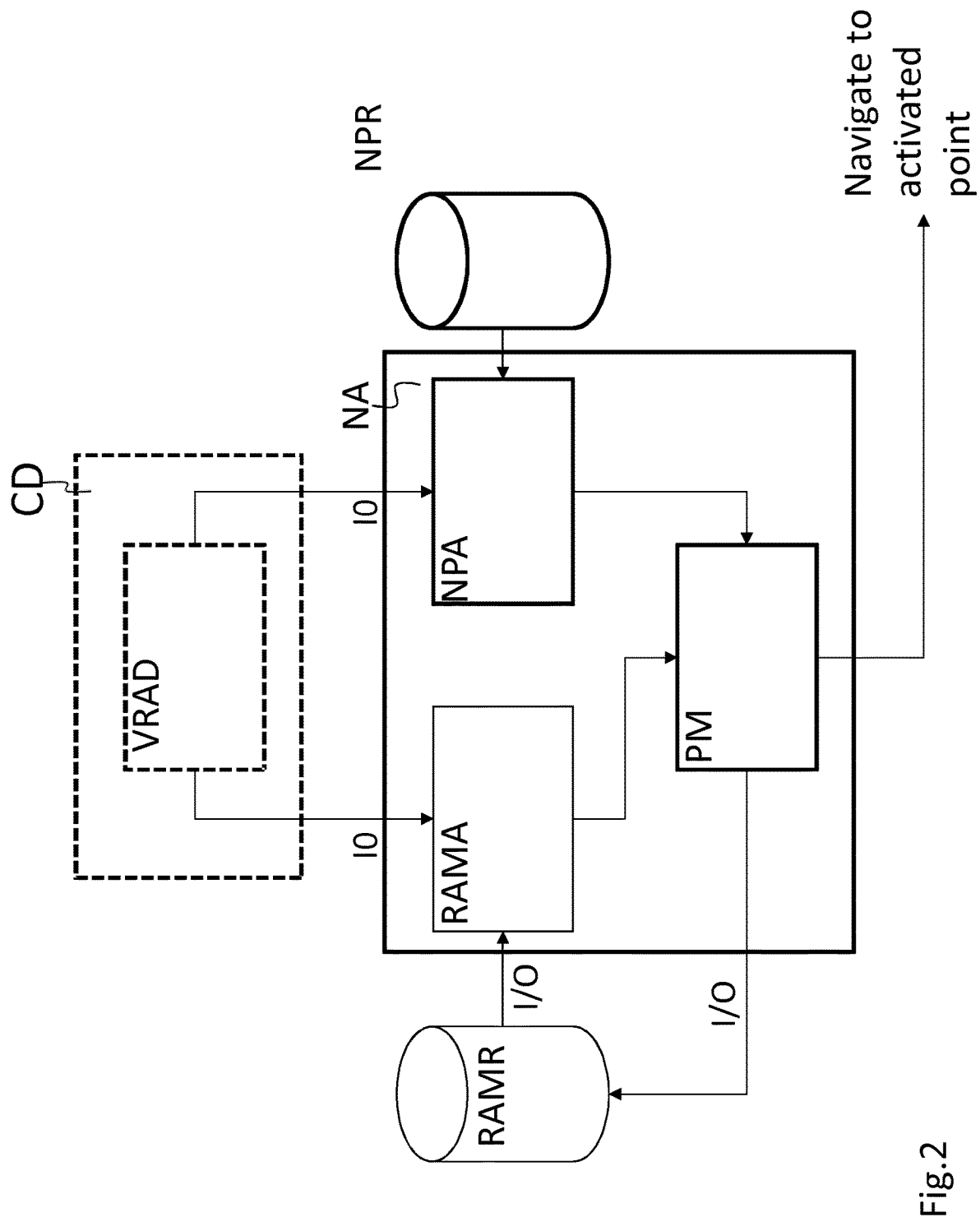
FIG. 2 represents the functional structure of an apparatus NA being configured to control navigating between navigation points of a 3-Dimensional video content in combination with a partial functional representation of the client device CD.

The apparatus NA as presented in FIG. 2 may comprise a navigation point agreement determining means NPA that is configured to determine a degree of agreement of a current viewpoint rotation angle with a navigation point of said plurality of navigation points A0 . . . Ax and a Navigation point repository NPR that is configured to store information on of said plurality of navigation points A0 . . . Ax additionally consisting of the visual geometry $G_V$ and the proximity function f.

The Navigation point repository NPR may be incorporated in the apparatus but may alternatively be located in a remote element.

The apparatus NA, additionally comprises a processing means PM, that is configured to activate a timing mechanism of the viewpoint activation, said timing mechanism comprising a delay for activating said timing mechanism of the viewpoint activation and a duration of an activation period of said timing mechanism at determining a certain degree of agreement of said current viewpoint rotation angle with a navigation point of said plurality of navigation points A0 . . . Ax.

The apparatus NA further may comprise a rotation angle model agreement determining Means RAMA that is configured to determine a degree of agreement of a portion of a viewpoint rotation angle trace with a viewpoint rotation model.

The apparatus NA further may comprise a Rotation angle Model Repository RAMR that is configured to store information rotation angle model repository RAMR being configured to store a viewpoint rotation angle model being a model that enables differentiating between a deliberate rotation angle motion towards a navigation point and a normal rotation angle motion that does not intent a navigation point selection. Such model can contain a the history of recent rotation angles, a data structure that is used to determine normal from intended motion (e.g. the tree structure when using decision-tree based classification, or the neural network structure & weights for a deep learning approach) and the potential false positives and false negatives]. This current viewpoint rotation angle is determined at and obtained from the rotation angle detection means VRAD which may be incorporated in the client device CD.

The Rotation angle Model Repository RAMR may be incorporated in the apparatus NA but may alternatively be located at a remote (network)-element.

The processing means PM of the apparatus NA, further is configured to adapt at least one of said delay for activating said timing mechanism of said viewpoint activation and said duration of said activation period of said timing mechanism based on at least one of said degree of agreement of said current viewpoint rotation angle with a navigation point of said plurality of navigation points A0 . . . Ax and said degree of agreement of said portion of said viewpoint rotation angle trace with said viewpoint rotation model.

The processing means PM of the apparatus NA is coupled with a first output-terminal to an output of the apparatus NA and is coupled with a first output-terminal to an input/output I/O of the apparatus NA.

The rotation angle model agreement determining Means RAMA has an input-terminal that is coupled to an input I0 of the apparatus NA, additionally is coupled with an input-terminal to an input/output I/O of the apparatus NA and furthermore is coupled to the to the processing means PM.

Further, the navigation point agreement means NPA also has an input-terminal that is coupled to an input I0 of the apparatus NA and additionally the navigation point agreement means NPA is coupled to the processing means PM.

In order to explain the present invention first it is assumed that a user currently is watching 3-dimensional video content like 3-dimensional gaming content, a free-to-roam 3D concert, a 3D movie as well as pseudo-3D use cases such as multi-view video with user-selectable views or alternatively multi-stream 360 video centred around the navigation points.

The rotation angle detection means VRAD incorporated in the client device CD associated with a user, at watching this 3-Dimensional video content by the user continuously detects the current viewpoint rotation angle of the user (see FIG. 3). The rotation angle detection means VRAD in this embodiment of the present invention is assumed to be a head/gaze tracker or a system based on sensors embedded in a Head Mounted Device (e.g. gyro).

At first, based on the current viewpoint rotation angle, being an input to the apparatus AN and at the same time an input to the navigation point agreement determining means NPA, the navigation point agreement determining means determines a degree of agreement of the current viewpoint rotation angle as determined by the rotation angle detection means VRAD, with a navigation point of said plurality of navigation points A0 . . . Ax as shown in FIG. 3. At first, this degree of agreement of the current viewpoint rotation angle with an activation point, amongst others depends on the visual geometry Gv (p) of an activation point (as is shown for navigation point A0 in FIG. 3) of said plurality of navigation points A0 . . . Ax, where the nearest distance from the activation geometry of a certain activation point to the visual ray may be determined.

In case of navigation point A0, the proximity function is also visualized with the dotted circle defining the maximum influence that this proximity function exhibits.

This distance, between the visual geometry of each activation point of the plurality of activation points and the visual ray may be calculated and based on the distance between each of the activation points and the visual ray, a score is calculated for each of the navigation points A0 . . . Ax. This score is high (e.g. '1') in case of a small distance between the visual geometry of each activation point of the plurality of activation points and the visual ray, e.g. the distance is 0 (i.e. the visual ray crosses the visual activation geometry for that activation point); In case of increasing distance between the visual activation geometry and the visual ray the score of the agreement will get lower. The activation point with the smallest distance to visual ray is assigned the highest score, i.e. the highest degree of agreement.

Now it is assumed that the current viewpoint rotation angle as is shown in FIG. 3. The distance, between the visual geometry of each activation point of the plurality of activation points and the visual ray may be calculated and based on the distance between each of the activation points and the visual ray, a score is calculated. This score is high (e.g. '1') as the visual ray almost crosses the visual geometry of activation point A0 and hence, the smallest distance between the visual geometry is determined for navigation point A0. The distance between the visual ray $R_V$ and each of the navigation points is larger than the distance between the visual ray $R_V$ and the navigation points A0. It appears to be the case that navigation point A0 has the smallest distance and hence the highest score, i.e. highest degree of agreement is assigned to navigation point A0.

At detecting of a certain degree of agreement, meaning that the visual ray is sufficiently close to a certain navigation point, in the current situation, close to navigation point A0, a timing mechanism of the viewpoint activation is activated after expiration of a certain delay for activating said timing mechanism of the viewpoint activation. This delay, further is referred to as initialization delay. At expiration of this initialization delay, an activation delay period is triggered and consequently, at start of the activation period a timer is started which timer expires at the end of the activation delay period. At expiration of this activation delay period the viewpoint of the user is moved towards the navigation point and the navigation point is accepted as the new eye position.

At start of the viewpoint activation period, a visual indicator is presented to the user indicating that the user will jump to the navigation point in view, in a short while (i.e. after the activation delay period).

Hence, the selection of a navigation point occurs when watching the point for a sufficiently long time. If the user continues to watch the navigation point, a visual indicator appears that the user will jump to that point in a short while. The user can still look away at that point in order to cancel the navigation.

Subsequently, after expiration of the activation delay period, in case this user still is looking at the activation point A0, the navigation point A0 is factually activated meaning that the current viewpoint of the meant user is moved towards the activation point A0. In case of a full 3D representation, one can move the viewpoint towards that navigation point with an animation that shows the movement of the scene. Alternatively one can simply cut to that viewpoint and not show the intermediate viewpoints. In other representations such as multi-view, one will select the view that corresponds to the activated activation point.

In order to prevent from unwanted activations of the timing mechanism, when watching the content, it is quite feasible that a user simply wants to watch in the direction of the navigation point without actually wanting to navigate to that direction, the present invention aims at solving this issue by making the initialization delay of the activation and duration of the activation period adaptive, by means of a prediction whether the user wants to trigger a navigation point or if (s)he simply wants to view the scene in the surroundings of this meant navigation point.

Therefore, in the present invention, the rotation angle model agreement determining Means RAMA, incorporated in the apparatus NA, additionally determines a degree of agreement of a portion of a viewpoint rotation angle trace with a viewpoint rotation model. Based on the current viewpoint rotation angle determined by the rotation angle detection means VRAD, this value together with all history values are stored and together form the viewpoint rotation angle trace indicating the trace of the viewpoint rotation angle over a period of time, capturing the movement of the ray trace over time. Portions thereof, i.e. a portion of the viewpoint rotation angle trace are retrieved and applied for determining a degree of agreement of such portion of a viewpoint rotation angle trace with a viewpoint rotation model being stored in the viewpoint rotation angle model repository RAMR. The degree of agreement is determined based on a frequency characteristic of said portion of said viewpoint rotation angle trace by generating at least one feature vector of said portion of said viewpoint rotation angle trace and subsequently classifying said at least one feature vector.

First, such feature vector $V_X$ is constructed, which feature vector consists of a concatenation of frequency histograms at a pre-defined number of time scales. For each timescale or range $T_y$, a frequency analysis of the viewpoint rotation angle trace is performed e.g. by means of a Discrete Cosine Transform (DCT). The result of this analysis subsequently is transformed into a histogram with a fixed number of bins that are spread along the expected frequency range. The portion of the feature vector $V_X$ for this timescale is the concatenation of the magnitude of each of these bins. Such feature vector represents a frequency characteristic of such ray trace movements for each of the assessed periods.

This type of feature vector allows for the identification of trace patterns at different time scales and frequency statistics.

More particularly, the agreement of a portion of a viewpoint rotation angle trace with a viewpoint rotation model may be determined by generating at least one vector of said viewpoint rotation angle trace as previously described and subsequently by classifying such at least one feature vector. In an embodiment of the present invention, e.g. a Multi-class classifier C is trained to return a discretized version of the initialization delay that matches the given feature vector $V_X$. The output delay variable represents the current delay that should be used when a compatible vector is in the model is detected. "0" means no delay, while 1 . . . n depicts an increasingly large delay. If the determined classification label is equal to the delay variable which was used to construct the vector, a match is found. If the system currently has initialization delay "2" for instance (this might be 2 seconds for example), the classifier needs to return "2" in order to be able to initialize the navigation point.

In this manner, ray trace movements are characterized in order to determine the intent of the user.

Each of these values are in addition to the determined degree of agreement of a current viewpoint rotation angle with an activation point, also input to the processing means PM which processing means PM subsequently, adapts at least one of said delay for activating said timing mechanism, i.e. the initialization delay, of said viewpoint activation and said duration of said activation period of said timing mechanism based on at least one of said degree of agreement of said current viewpoint rotation angle with a navigation point of said plurality of navigation points and said degree of agreement of said portion of said viewpoint rotation angle trace with said viewpoint rotation model.

In other words, when the user navigates into a rotation angle range which is compatible with one of the defined navigation points, the user enters the navigation point agreement phase. The diagram in FIG. 4 indicates that the user is in this range. When this user enters the navigation point agreement, a timing variable t is reset. t indicates how long the user has been in navigation point agreement.

First of all, one waits for t to progress beyond an optional minimum delay. Such a minimum delay can be configured to prevent the system from reacting too quickly to the user movements. After this delay, a check is made to determine whether the rotation angle of the user is still in agreement with the navigation point (i.e. the user hasn't moved away from the navigation point).

The vectors are then constructed as was described previously. A classification is made that indicates whether the current rotation angle trace is in agreement with the rotation angle model.

If the classification does not result in matches, the process is repeated unless the user moved away from the navigation point or a maximum delay has occurred. The maximum delay makes sure that, even if the rotation angle model does not detect the rotation as an anomaly, or in other words, where the rotation angle is in conformance with the rotation angle model RAMR, the user can still initialize the activation point when the user watches it long enough.

When the classification on the other hand has a match, i.e. the degree of agreement of a current viewpoint rotation angle with an activation point has reached a certain value, the navigation point is initialized immediately. This means that the visual progress indicator will be shown to the user and if the user watches sufficiently long, the navigation point will be activated meaning that the user viewpoint will be repositioned to this point.

The processing means PM at least adapts the values of the initialization delay based on the delay value that corresponds to the best classifier match as determined in the classification of each generated feature vector corresponding an assessed period.

The duration of said activation period of said timing mechanism is not adapted in the before disclosed embodiment.

Figure 4:
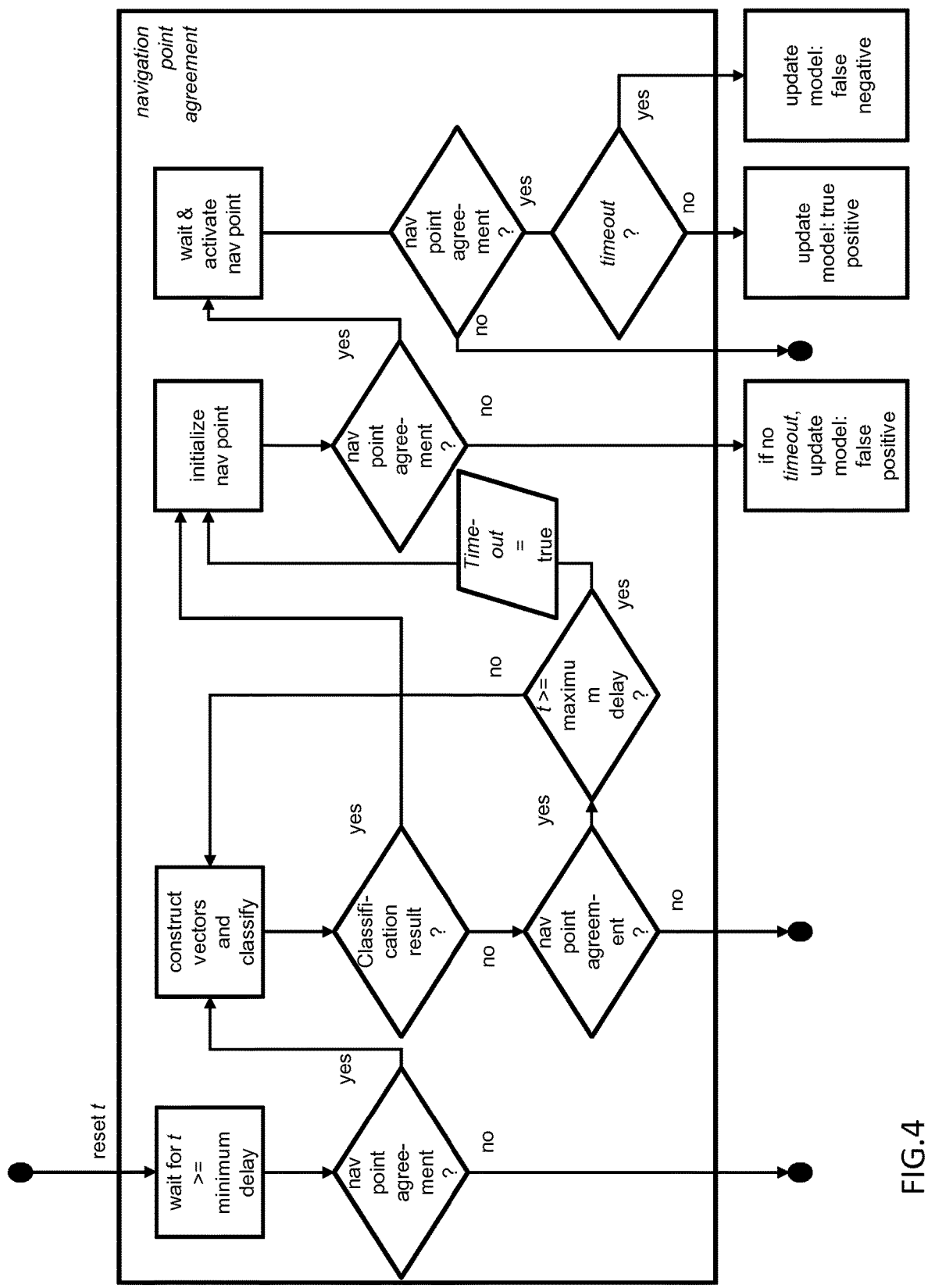
FIG. 4 represents a diagram for determining the actions when navigation point agreement was reached. In that case, the navigation point motion is analyzed in order to identify anomalies which are related to the intent of the user to select the relevant navigation point.

Additionally, as is shown in FIG. 4, the viewpoint rotation model is updated with the frequency characteristic of said portion of said viewpoint rotation angle trace.

In case of a false negative, which situation occurs when the navigation point is initialized and activated by a timeout rather than a model match. Hence, the viewpoint rotation couldn't predict that the user actually wanted to navigate to that point. In this case, the knowledge of the maximum delay D is used to locate the time slot which has the representative frequency data.

In case of a false positive, which situation occurs when the user looks away from the navigation point before it was activated (but it was initialized), it is an indication that the initialization was not intended by the user. As such, this should be interpreted as a so-called false positive and the model should be updated in order to prevent this from happening the next time. The delay is increased in order to delay a match in the future, and the frequency feature is removed if this delay becomes the maximum delay.

In case of a true positive, which situation occurs when a navigation point has been initialized and activated by the model successfully. As the user did not move away from the point after initialization, the assumption is that the move was actually wanted by the user. The delay is reduced to make the initialization faster for the next time that this situation occurs.

In a further alternative embodiment of the present invention, the "navigation point agreement determining means" NPA may be implemented by being configured to determine a threshold value of the degree of agreement as in order to obtain a binary decision rather than a continuous "agreement" value.

In case the degree of agreement exceeds a predefined threshold (meaning the user is sufficiently looking at a navigation point), which was not the case in the previous time instance, a "looks at" event is sent to the "processing means PM.

Likewise, if the degree of agreement decreases below the predefined threshold while it was above in the previous time instance, a "looks away" event is sent at certain degree of agreement.

In this further alternative embodiment of the present invention, the "viewpoint rotation navigation point agreement" RAMA may be implemented by being configured to determine a threshold value in order to obtain a binary decision rather than a continuous "agreement" value.

The rotation angle model agreement means RAMA in this embodiment is configured to determine the angle agreement, by means of a sliding window over the rotation angle trace. For a certain point in time t, the sliding window consists of the trace data within time range [t−T, t], with T the window size. One constructs a vector $H_t$ that represents the histogram of the frequencies in this sliding window for time instance t (i.e. the current time).

The rotation angle model agreement means RAMA additionally is configured to compare this vector $H_t$ with one or more predefined vector $H_R$. These predefined vectors should be interpreted as the "rotation angle model", and specify what should be seen as an anomaly in the rotation angle trace which vectors vector $H_R$ may be maintained at the angle model agreement repository RAMR. In order to assess whether $H_t$ represents an anomaly, a "distance" is calculated between $H_t$ and each of the $H_R$ vectors. If one of these distances is less than a certain threshold $T_m$, an anomaly is detected and a "trace anomaly" event is sent to the "processing means PM.

The metric that is used to generate this distance can be calculated in many ways. One example is by using the Euclidean distance. Another would be to take the maximum of the absolute differences in each of the histogram bins.

Finally, the processing means PM in this further alternative embodiment of the present invention is configured to be based on both inputs of the respective navigation point agreement determining means NPA and rotation angle model agreement means RAMA, being the "looks at", "looks away" and "trace anomaly" events from the respective means and based here on generates "initialize" and "activate" events. The initialize event can then be used to start showing the User Interface notification to the user that, if he/she keeps looking in that direction, that navigation will happen towards the meant navigation point. The activate event actually starts the navigation to the meant navigation point.

Figure 5:
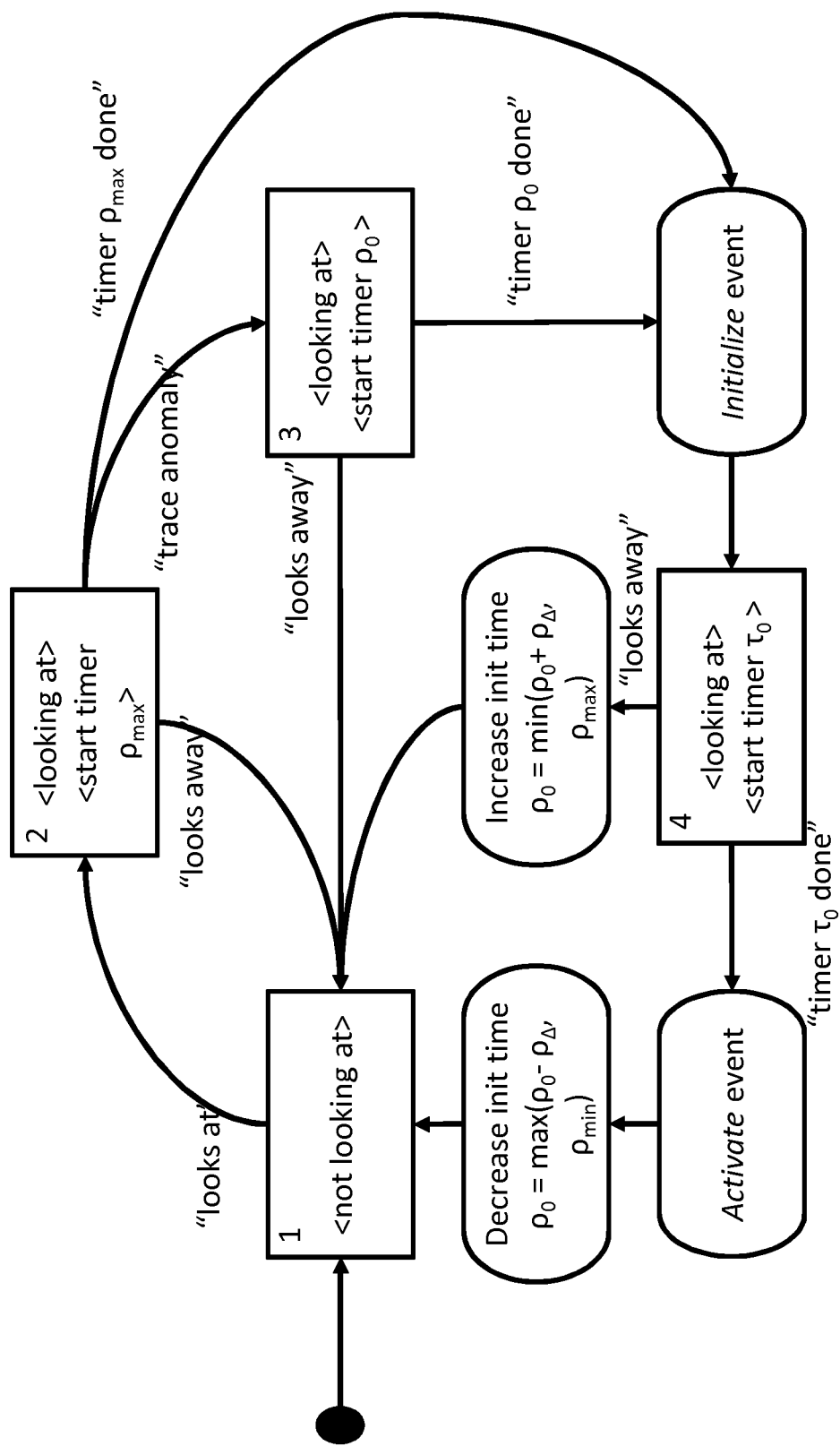
FIG. 5 represents a diagram for another embodiment that is event based and in which the actions are shown that are needed to send the initialize and activate events of an activation point.

The FIG. 5 shows a state diagram of including a flow of events. Note that only state transitions are shown by arrows. If events cause the state not to change, no arrows are drawn to limit the visual overhead.

The initial position is the dot D, wherefrom immediately a transition is made into state 1. This state represents the case where the user is not looking at a navigation point. When the user watches a navigation point, the "looks at" event will be received and a transition is made into state 2.

At this point, the user watches a navigation point, however no anomaly has been detected in the trace. When moving to state 2, a timer is started that initiates an event when $\rho_{max}$ has lapsed, where $\rho_{max}$ is the maximum time one can look at a certain navigation point without the initialize event being initiated. There are 3 options now:

Either the user "looks away" again and transition is made into state 1.

A trace anomaly is detected and transition is made into state 3.

No trace anomaly was detected, however $\rho_{max}$ has lapsed since looking at the navigation point. In this case we move, via the initialize event to state 4. This is a fallback mechanism when the rotation angle model cannot predict an anomaly.

State 3 represents the case where the user is looking at a navigation point, and an anomaly was detected. A timer is started that fires an event after $\rho_0$ has lapsed. This is the delay that occurs before showing a UI notification. When this event fires (and the user still looks at the navigation point), the initialize event is sent (and can be picked up by the UI). A transition into state 4 is made then.

State 4 represents the case where the UI is showing a notification, but the navigation hasn't happened yet. A timer is now started that fires an event after the activation delay $\tau_0$ has past. Note: $\tau_0$ here refers to the relative time between initialization and activation, which $\tau_0$ is not consistent with the activation delay $\tau_0$ in the first embodiment where it represents the absolute time from the moment an anomaly was detected.

When the timer $\tau_0$ has lapsed, the activate event is sent and $\rho_0$ is decreased by a predefined amount to make the system more responsive the next time (as, apparently, the user did indeed intend to activate the navigation point and this is seen as positive feedback for the system). After this a transition is made into state 1.

If the user looks away from the navigation point while being in state 4, this is considered to be negative feedback and consequently, the initialization delay $\rho_0$ is increased.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method for navigating between navigation points of a 3-dimensional space, said 3-dimensional space comprising a plurality of navigation points, said method comprising:
    detecting a current viewpoint rotation angle; and
    determining a degree of agreement of said current viewpoint rotation angle with a navigation point of said plurality of navigation points; and
    activating a timing mechanism of a viewpoint activation, said timing mechanism comprising a delay for activating said timing mechanism of the viewpoint activation and a duration of an activation period of said timing mechanism at determining a certain degree of agreement of said current viewpoint rotation angle with the navigation point of said plurality of navigation points, where said method further comprises:
    determining a degree of agreement of a portion of a viewpoint rotation angle trace with a viewpoint rotation model; and
    adapting at least one of said delay for activating said timing mechanism of said viewpoint activation and said duration of said activation period of said timing mechanism based on at least one of said degree of agreement of said current viewpoint rotation angle with the navigation point of said plurality of navigation points and said degree of agreement of said portion of said viewpoint rotation angle trace with said viewpoint rotation model.

2. The method according to claim 1, wherein said adapting at least one of said delay for activating said timing mechanism of said viewpoint activation and said duration of said activation period of said timing mechanism additionally is based on saliency information associated with said plurality of navigation points and/or is based on a saliency map.

3. The method according to claim 1, wherein said degree of agreement of said current viewpoint rotation angle with the navigation point depends on at least one of: a visual geometry of the navigation point of said plurality of navigation points, a distance between the navigation point and a visual ray and a distance between the navigation point and an eye position.

4. The method according to claim 1, wherein said agreement said portion of said viewpoint rotation angle trace with said viewpoint rotation model is determined based on a frequency characteristic of said portion of said viewpoint rotation angle trace.

5. The method according to claim 4, wherein said degree of agreement of said portion of said viewpoint rotation angle trace with said viewpoint rotation model is determined by generating at least one vector of said portion of said viewpoint rotation angle trace and subsequently classifying said at least one vector.

6. The method according to claim 4, said method further comprising:
updating said viewpoint rotation model with said frequency characteristic of said portion of said viewpoint rotation angle trace.

7. An apparatus configured to control navigating between navigation points of a 3-dimensional video content, said 3-dimensional video content comprising a plurality of navigation points, said 3-dimensional (space) video content being transmitted from a server towards a client device, said apparatus comprising:
at least one processor; and
at least one memory including computer program code;
the at least one memory and the computer program code configured to, with the at least one processor, cause the apparatus at least to perform:
determining a degree of agreement of a current viewpoint rotation angle with a navigation point of said plurality of navigation points;
activating a timing mechanism of a viewpoint activation, said timing mechanism comprising a delay for activating said timing mechanism of the viewpoint activation and a duration of an activation period of said timing mechanism at determining a certain degree of agreement of said current viewpoint rotation angle with the navigation point of said plurality of navigation points;
determining a degree of agreement of a portion of a viewpoint rotation angle trace with a viewpoint rotation model; and
adapting at least one of said delay for activating said timing mechanism of said viewpoint activation and said duration of said activation period of said timing mechanism based on at least one of said degree of agreement of said current viewpoint rotation angle with the navigation point of said plurality of navigation points and said degree of agreement of said portion of said viewpoint rotation angle trace with said viewpoint rotation model.

8. The apparatus according to claim 7, wherein the at least one memory and the computer program code are configured to, with the at least one processor, cause the apparatus at least to perform adapting said at least one of said delay for activating said timing mechanism of said viewpoint activation and said duration of said activation period of said timing mechanism additionally based on saliency information associated with said plurality of navigation points based on a saliency map.

9. The apparatus according to claim 7, wherein the at least one memory and the computer program code configured to, with the at least one processor, cause the apparatus at least to perform determining said degree of agreement of a current viewpoint rotation angle with the navigation point based on considering at least one of a visual geometry of the navigation point of said plurality of navigation points, a distance between the navigation point and a visual ray and a distance between the navigation point and an eye position.

10. The apparatus according to claim 7, wherein the at least one memory and the computer program code configured to, with the at least one processor, cause the apparatus at least to perform determining said agreement of said portion of said viewpoint rotation angle trace with said viewpoint rotation model based on a frequency characteristic of said portion of said viewpoint rotation angle trace.

11. The apparatus according to claim 10, wherein the at least one memory and the computer program code configured to, with the at least one processor, cause the apparatus at least to perform determining said degree of agreement of said portion of said viewpoint rotation angle trace with said viewpoint rotation model by generating at least one vector of said viewpoint rotation angle trace and subsequently classifying said at least one vector.

12. The apparatus according to claim 10, wherein the at least one memory and the computer program code configured to, with the at least one processor, cause the apparatus at least to perform updating said viewpoint rotation model with said frequency characteristic of said portion of said viewpoint rotation angle trace.

13. A system for navigating between navigation points of a 3-dimensional video content-, said 3-dimensional video content comprising a plurality of navigation points, said 3-dimensional video content being transmitted from a server of said system towards a client device included in said system, said system comprising-:
at least one processor; and
at least one memory including computer program code;
the at least one memory and the computer program code configured to, with the at least one processor, cause the system at least to perform:
detecting a current viewpoint rotation angle;
determining a degree of agreement of a current viewpoint rotation angle with a navigation point of said plurality of navigation points;
activating a timing mechanism of a viewpoint activation, said timing mechanism comprising a delay for activating said timing mechanism of the viewpoint activation and a duration of an activation period of said timing mechanism at determining a certain degree of agreement of said current viewpoint rotation angle with a navigation point of said plurality of navigation points;
determining a degree of agreement of a portion of a viewpoint rotation angle trace with a viewpoint rotation model;

adapting at least one of said delay for activating said timing mechanism of said viewpoint activation and said duration of said activation period of said timing mechanism based on at least one of said degree of agreement of said current viewpoint rotation angle with the navigation point of said plurality of navigation points and said degree of agreement of said portion of said viewpoint rotation angle trace with said viewpoint rotation model.

14. A server in a system for navigating between navigation points of a 3-dimensional video content comprising:
at least one processor; and
at least one memory including computer program code;
the at least one memory and the computer program code configured to, with the at least one processor, cause the server at least to perform:
determining a degree of agreement of a current viewpoint rotation angle with a navigation point of a plurality of navigation points;
activating a timing mechanism of a viewpoint activation, said timing mechanism comprising a delay for activating said timing mechanism of the viewpoint activation and a duration of an activation period of said timing mechanism at determining a certain degree of agreement of said current viewpoint rotation angle with the navigation point of said plurality of navigation points;
determining a degree of agreement of a portion of a viewpoint rotation angle trace with a viewpoint rotation model; and
adapting at least one of said delay for activating said timing mechanism of said viewpoint activation and said duration of said activation period of said timing mechanism based on at least one of said degree of agreement of said current viewpoint rotation angle with the navigation point of said plurality of navigation points and said degree of agreement of said portion of said viewpoint rotation angle trace with said viewpoint rotation model.

15. A client device in a system for navigating between navigation points of a 3-dimensional video content comprising:
at least one processor; and
at least one memory including computer program code;
the at least one memory and the computer program code configured to, with the at least one processor, cause the client device at least to perform:
determining a degree of agreement of a current viewpoint rotation angle with a navigation point of a plurality of navigation points;
activating a timing mechanism of a viewpoint activation, said timing mechanism comprising a delay for activating said timing mechanism of the viewpoint activation and a duration of an activation period of said timing mechanism at determining a certain degree of agreement of said current viewpoint rotation angle with the navigation point of said plurality of navigation points;
determining a degree of agreement of a portion of a viewpoint rotation angle trace with a viewpoint rotation model; and
adapting at least one of said delay for activating said timing mechanism of said viewpoint activation and said duration of said activation period of said timing mechanism based on at least one of said degree of agreement of said current viewpoint rotation angle with the navigation point of said plurality of navigation points and said degree of agreement of said portion of said viewpoint rotation angle trace with said viewpoint rotation model.

* * * * *